July 2, 1957          W. F. GRATTAN          2,797,594
AUTOMATIC TRANSMISSION FOR AUTOMOTIVE VEHICLES
Original Filed June 30, 1953          4 Sheets-Sheet 4
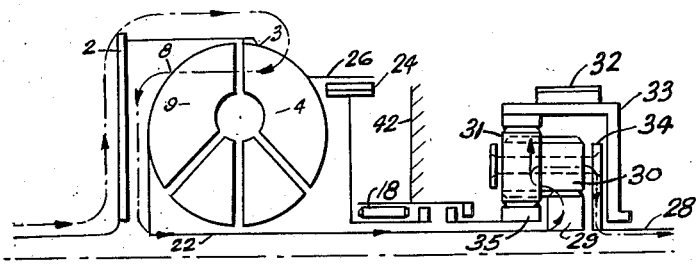
FIG_5A
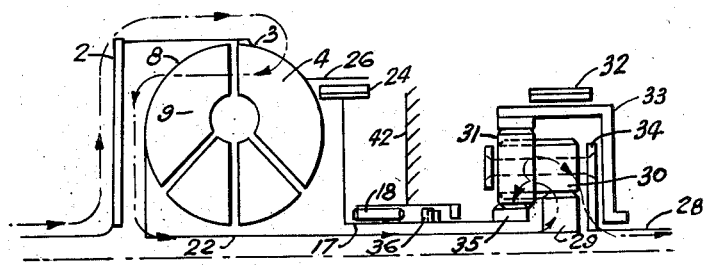
FIG_5B
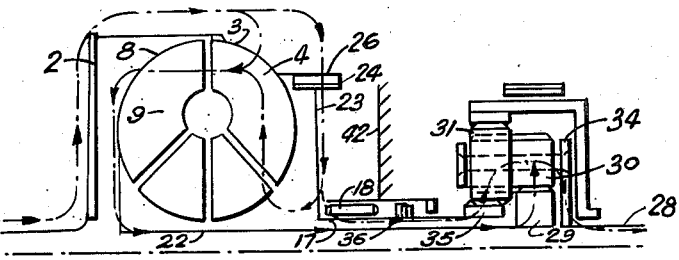
FIG_5C
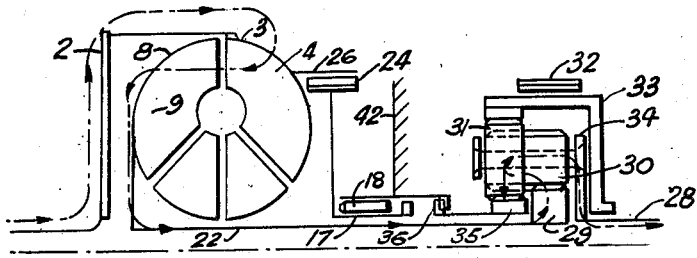
FIG_5D
INVENTOR.
WORTHIN F. GRATTAN
BY Worthin F. Grattan United States Patent Office 2,797,594
Patented July 2, 1957

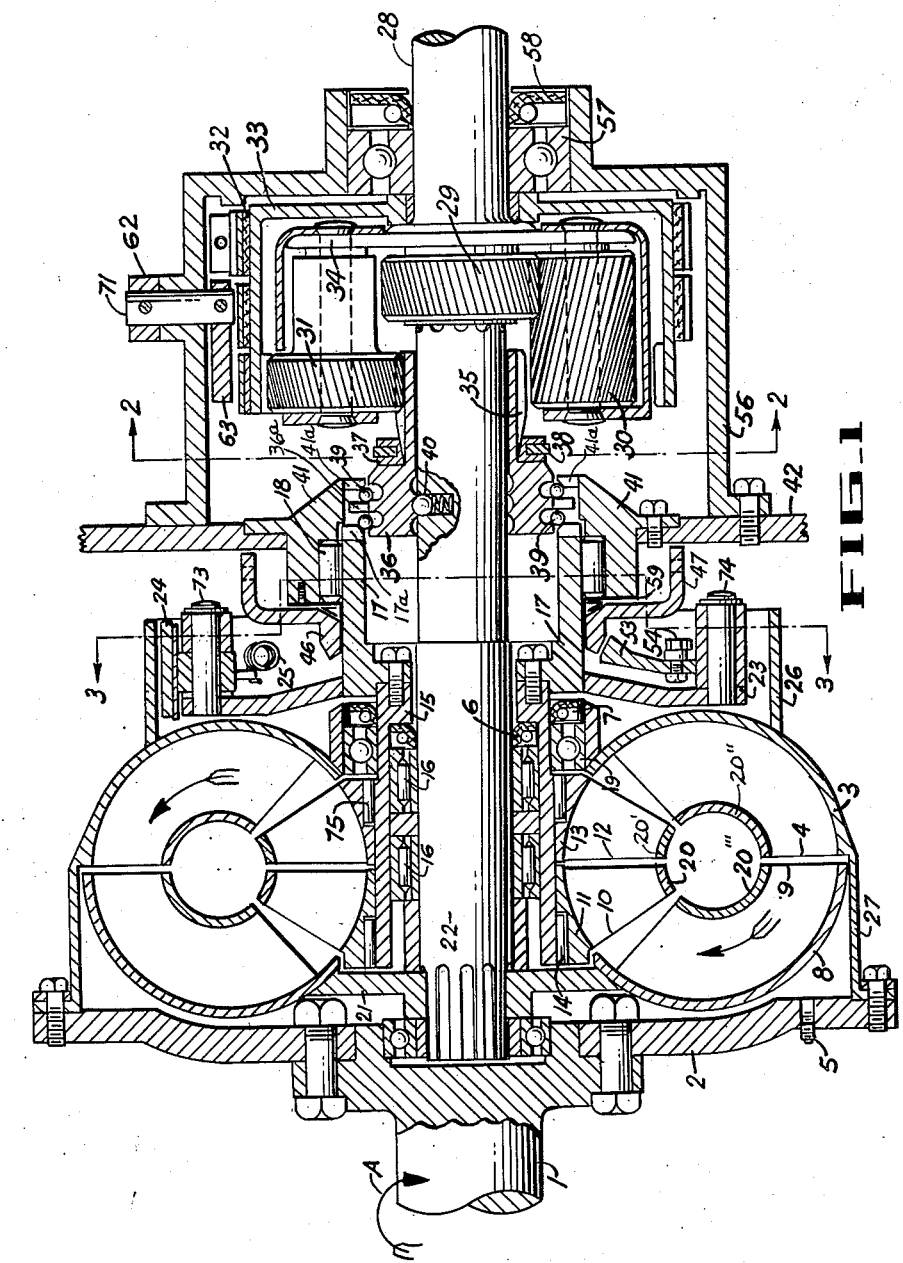

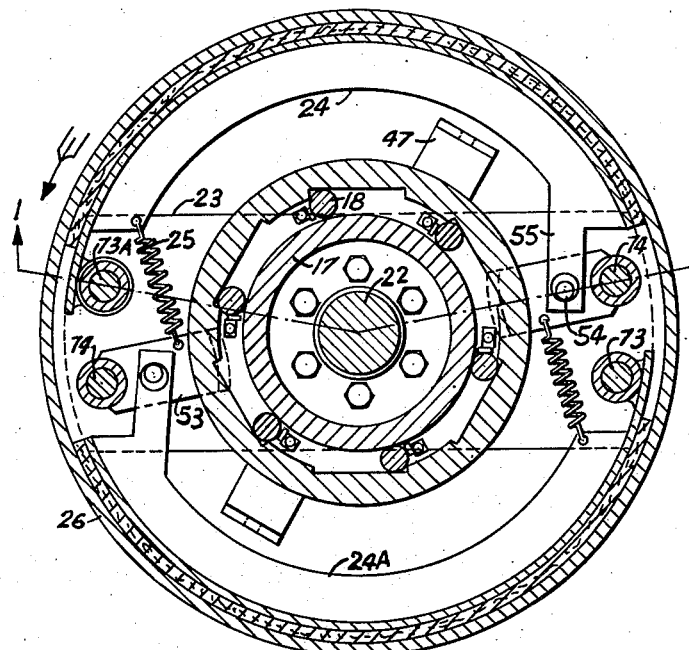
FIG_3
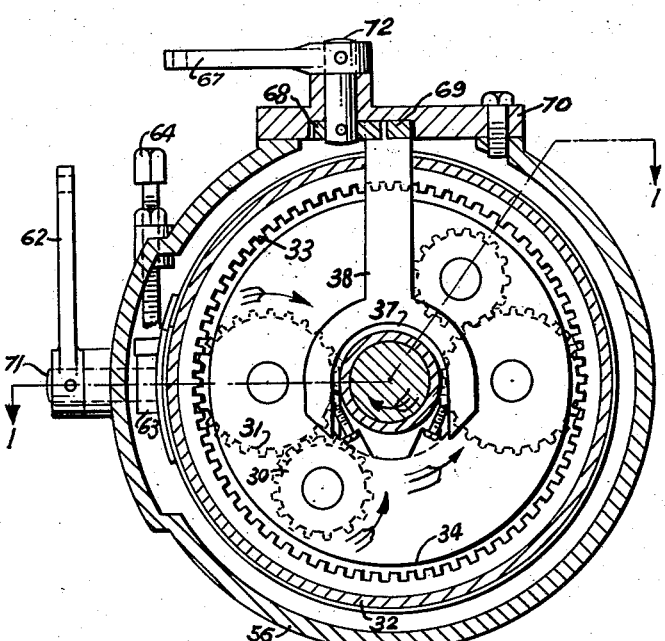
FIG_2
INVENTOR.
WORTHIN F. GRATTAN
BY Worthin F. Grattan

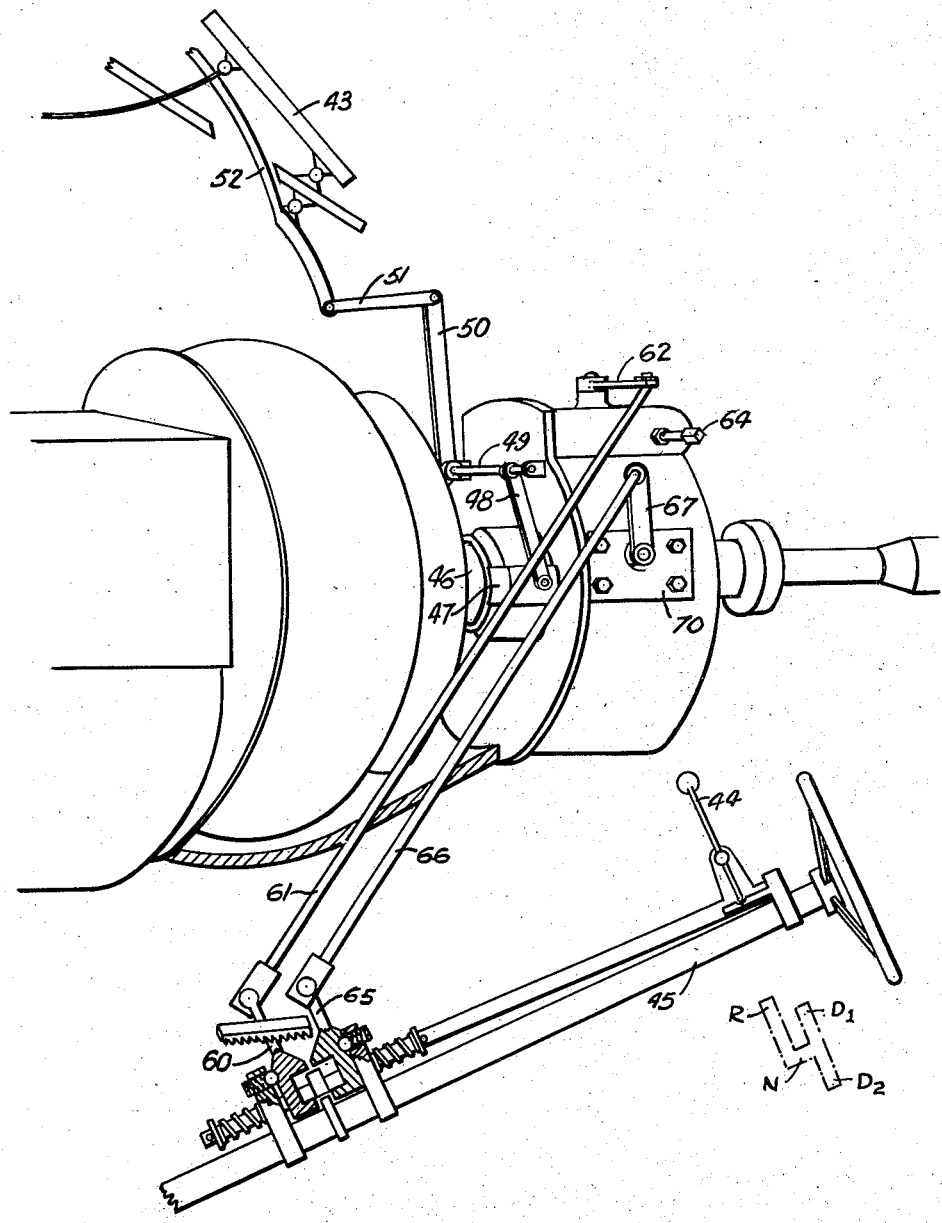

2,797,594

AUTOMATIC TRANSMISSION FOR AUTOMOTIVE VEHICLES

Worthin F. Grattan, Los Gatos, Calif.

Continuation of application Serial No. 365,282, June 30, 1953. This application September 28, 1954, Serial No. 458,779

7 Claims. (Cl. 74—732)

The present invention relates to automatic transmissions for automotive vehicles and more particularly to automatic transmissions incorporating hydraulic torque converters.

It is an object of the present invention to provide an automatic transmission which, when incorporated in an automotive vehicle, simplifies vehicle operation; but, at the same time, gives the operator positive control of the speed and acceleration of the vehicle.

A further object of the invention is to provide an automatic transmission that enables the application of high torque to the driving wheels of the vehicle to facilitate rapid starting, hill-climbing and the like while preserving and enhancing overall economy of operation.

It is another object of the invention to provide an automatic transmission that includes in addition to a hydraulic torque converter, a planetary gear train and an automatic clutch that are arranged to enable the transmission of power from a driving to a driven shaft through any one of several diverse transmission paths as selected by the vehicle operator.

An additional object is to provide an automatic transmission embodying an improved control arrangement whereby the selection of the power transmission path from the driving to the driven shaft is facilitated.

These and other objects of the invention as well as the advantages stemming therefrom will become more apparent from a perusal of the following description of the accompanying drawings wherein:

Fig. 1 is a longitudinal sectional view of an automatic transmission embodying the present invention, partly taken along line 1—1 in Fig. 2 and line 1—1 in Fig. 3.

Fig. 2 is a transverse sectional view taken along line 2—2 in Fig. 1.

Fig. 3 is another transverse sectional view taken along line 3—3 of Fig. 1.

Fig. 4 is a perspective view of the automatic transmission and the controls therefor, and Figs. 5A to 5D are a series of diagrammatic illustrations of different paths of power transmission from the driving to the driven shaft.

As shown best in Fig. 1, the automatic transmission embodying the present invention is arranged to connect a driving shaft 1, such as the crankshaft of an automotive vehicle, to a driven shaft 28 which is axially aligned with the driving shaft 1 and is connected through suitable differential gearing to the rear wheels of the vehicle thus enabling varying amounts of torque to be applied to these wheels, as controlled by the operator of the vehicle.

More particularly, when the driving shaft 1 is caused to rotate, its torque can be multiplied by the torque converter and a planetary gear train for transmission to the driven shaft or alternatively, and under control of the vehicle operator, substantialy a direct drive can be established between the driving and driven shafts 1 and 28, respectively, by means of an automatic clutch so that in effect, the torque converter and planetary gear train are bypassed, and no torque multiplication is obtained. The precise manner by which the alternative transmission paths can be established will be understood from the following detailed description of the automatic transmission illustrated in the accompanying drawings.

To the end of the driving shaft 1 is bolted an annular disc or flywheel 2 that forms one wall of the housing for the hydraulic torque converter. The remainder of the converter housing is formed by a short cylindrical tube 27 that is bolted at its one end adjacent the outer edge of the flywheel 2 and has an integral extension 3 at its other end which curves inwardly in an arcuate path. A plurality of circularly-spaced driving vanes 4 are affixed to the interior of the arcuate extension 3 so as to project into a generally doughnut-shaped chamber having an interrupted or segmental wall, one segment of which is formed by this arcuate extension 3. These vanes 4 are shaped in a manner such that, upon rotation of the driving shaft 1, fluid contained within the chamber is impelled against a plurality of driven vanes 9 that project into the chamber from another arcuate wall segment 8 mounted by means of an integral flange 21 for rotation with a shaft 22. This shaft 22 is disposed between the driving and driven shafts 1 and 28, respectively, in axial alignment therewith and is supported for free rotation relative to either of those shafts on suitable ball bearings. The driven vanes 9 are curved in a manner such that fluid impelled thereagainst is redirected so as to approach two adjacent series of reactor vanes 10, 12 in a reverse direction relative to the forward rotative travel of the driving shaft 1 and the driving vanes 4 secured thereto.

The two series of reactor vanes 10, 12 are arranged to redirect the fluid impelled thereagainst by the driven vanes 9 toward and in the direction of rotative advance of the driving vanes 4. For this purpose, the reactor vanes 10, 12 are secured respectively to small arcuate wall segments 11, 13, each of which is mounted by overrun rollers 14 and 75 on a sleeve 15 so that reverse rotation of the segments 11, 13 and the attached vanes 10, 12 relative to this sleeve is precluded. The sleeve 15 is supported for free rotation about the intermediate shaft 22 by roller bearings 16; and ball bearings 19 between the sleeve 15 and the end of the arcuate wall segment 3 permit relative rotation therebetween. The sleeve 15 projects from the end of the housing, as defined by this wall segment 3, and its end is bolted to another sleeve 17 which is held against reverse rotation relative to a stationary portion 42 of the transmission frame by overrun rollers 18 disposed between the sleeve 17 and a race 41 that is bolted to said frame portion 42. Since the connected sleeves 15 and 17 are held against reverse rotation relative to a stationary part and the reactor vanes 10, 12 are held against reverse rotation relative to the sleeve 15, the reactor vanes are also held against reverse rotation relative to a stationary part. The shape of the reactor vanes 10, 12 is such that when thus held against reverse rotation, fluid is redirected from said reactor vanes toward the driving vanes 4. Arcuate guide elements 20, 20′, 20″ and 20‴ connect the ends of each series of reactor vanes 10, 12 as well as the ends of the driving vanes 4 and the driven vanes 9, respectively, so that the fluid within the housing will pass from one set of vanes to another with a minimum of turbulence and slippage. To prevent leakage of fluid from the housing of the torque converter, where the sleeve 15 projects therefrom, suitable seals 6, 7 are disposed between the shaft 22 and the sleeve 15 and between the sleeve 15 and the inner end of the arcuate segment 3.

When a predetermined amount of input torque is supplied to the torque converter by causing the driving shaft 1 to revolve at a certain angular velocity in the direction indicated by the arrow A in Fig. 1, the driving vanes 4 will rotate with the same angular velocity, Fluid will be impelled from these vanes 4 toward the driven vanes 9 to cause the latter to rotate in the same direction but for the time being at a lower angular velocity. Since these driven vanes 9 are of a predetermined curved shape and are revolving more slowly than the driving vanes 4, the fluid driven thereagainst will be redirected against the reactor vanes 10, 12 along a path opposite to the direction of rotation of the driving and driven vanes 4, 9. Since the reactor vanes 10, 12 are held against rotation in this reverse direction, the fluid will be redirected once more to move in a forward direction to add vectorially its force to that already urging the driving vanes 4 forwardly. Consequently, the energy which is not transferred to the driven vanes is not lost; but is, to a large degree, recovered.

As the driving vanes 4 continue to revolve, the driven vanes 9 gradually approach the same angular velocity, so that the redirection of fluid against the reactor vanes 10, 12 lessens. Ultimately no fluid urges the reactor vanes 10, 12 in the reverse direction and they as well as the driving and driven vanes rotate forwardly so that the torque converter revolves substantially as a unit and becomes in effect a fluid coupling with a torque ratio of 1 to 1.

The torque transmitted from the torque converter to the intermediate shaft 22 constitutes the input to the mentioned train of planetary gears that includes a sun gear 29 which is splined to said intermediate shaft 22. The sun gear 29 meshes with a pair of planetary gears 30 supported for individual rotation on a planet cage or carrier 34 at diametrically opposed points, as shown in Fig. 2. The planet gears 30 are relatively long so as to project beyond the sun gear 29 where they each mesh with a short planetary gear 31 supported circularly adjacent thereto on the aforementioned planet carrier 34. The carrier itself is fixed to the driven shaft 28 to rotate therewith.

The operation of the planetary gear train and the driven shaft 28 is controlled by concentrically-arranged reactor gears 33, 35, both of which mesh with the short planetary gears 31 but do not mesh with the longer planetary gears 30 which are smaller in diameter so as to pass freely between these concentric gears 33, 35 (Fig. 2). The outer gear 33 constitutes a ring gear mounted by suitable bearings for free rotation about the driven shaft 28 with its exterior surface arranged for engagement by a brake band 32. Said brake band can be manually shifted between ring gear engaging and non-engaging positions by mechanism hereinafter described to maintain said ring gear stationary or to permit the same to rotate freely. The inner gear 35 is a sun gear formed at one end of a sleeve-like control element 36 that loosely surrounds the intermediate shaft 22 so that it can freely rotate thereabout and slide axially thereon. More particularly, this control element 36 is movable axially of the shaft 22 between three control positions. The central position, as illustrated in Fig. 1, is such that radially projecting teeth 36a on the remote end of the control element 36 as viewed from the inner gear 35 are disposed between, and thus free from engagement with, mating teeth 41a formed at the end of the previously mentioned stationary race 41 and similar teeth 17a formed at the end of the sleeve 17. To shift the control element 36, a collar 37 provided around a central area of its outer surface is engaged by a shifting fork 38 that is actuated by mechanism to be hereinafter described. A detent 40 in the form of a spring-urged ball seated in a recess in shaft 22 engages one of three annular grooves in the inner surface of the control element to resiliently restrain axial movement thereof and thus avoid accidental shifting of the control element from a selected position. When the control element is moved from one of its positions to another, synchronizing springs 39 of known design disposed adjacent the projecting teeth provide for meshing of the mating teeth without "chattering."

Both the brake band 32 and the control element 36 are actuated in an appropriate fashion by movement of a conventional shifting lever 44 supported on the steering post 45 of the vehicle as shown in Fig. 4. More particularly, predetermined movement of the shifting lever 44 operates through a linkage train 60, 61, 62 to rotate a shaft 71 that passes through a stationary casing 56 which encompasses the planetary gear train (Fig. 2). Rotation of shaft 71 actuates a cam 63 which, depending upon the direction of motion, causes the brake band 32 to become engaged or disengaged with the exterior surface of the described ring gear 33. An adjustment nut 64 may be provided to control the extremes of movement of the brake band when the cam 63 is actuated as described. The shifting lever 44 is also arranged through another linkage train 65, 66, 67 to cause rotation of another shaft 72 that passes through a plate 70 attached to the side of the gear casing 56. The rotation of shaft 72 produces rotation of a cam 68 that shifts a bar 69 which is operatively connected to the hereinbefore described shift fork 38 for the control element 36. It is to be understood that the details of the described shifting mechanism are purely exemplary and alternative mechanical or electrical linkages for producing the desired movement of the brake band 32 and the control element 36 will readily occur to those skilled in the art.

The mentioned gear casing 56 is generally cup-shaped, being bolted at its lip to the described stationary frame portion 42 and has suitable bearings 57 (Fig. 1) in its base for support of the driven shaft 28. To retain lubricant within the casing 56, a seal 58 is arranged adjacent these bearings 57 and an additional seal 59 is disposed adjacent the overrun rollers 18 in the race 41 which is supported by the stationary frame portion 42 as previously described.

With the shifting lever 44 in "neural" position, indicated at N in Figure 4, the control element 36 is in its central position as shown in Fig. 1 and the brake band is out of engagement with the ring gear 33. During operation of the engine the rotation of the driving shaft is transmitted through the torque converter to, and rotates the intermediate shaft 22 and the sun gear 29 thereon. This rotation of the sun gear 29 will be transmitted to the planetary gears 30 and 31 and will in turn cause rotation of both the control element 36 and the ring gear 33. Since the latter are completely free to rotate, they provide no reactive force, and no motion will be imparted to the driven shaft 28 through the attached carrier 34. Since no power is transmitted to the driven shaft 28, the vehicle will remain stationary with the engine running.

Shifting of lever 44 to reverse position, which is indicated at R in Figure 4, is arranged to force the brake band 32 against the ring gear 33 to hold it stationary but will not move the control element 36. The path of power in this reverse position is diagrammatically illustrated by arrows in Fig. 5A. As in the previously described neutral position, power will be transmitted through the torque converter to the intermediate shaft 22 effecting rotation of the sun gear 29 in the forward direction as indicated by the central arrow in Fig. 2. Such rotation of the sun gear 29 in a clockwise direction, as seen in Fig. 2, will cause counterclockwise rotation of long planetary gears 30 and clockwise rotation of the short planetary gears 31. Since the ring gear 33 meshing with these short planetary gears 31 is held stationary by the brake band 32, they will be constrained to walk or move in an epicyclic fashion around the ring gear 33 in a counterclockwise direction so as to cause the carrier 34 and connected driven shaft 28 to rotate in a counterclockwise direction which is the reverse direction relative to the rotation of the driving shaft 1. The control element 36 is freely rotatable so that it will have no effect on the described action.

If the shifting lever 44 is now moved to what may be termed a first drive position, which is indicated at $D_1$ in Figure 4, the brake band 32 is withdrawn from engagement with the ring gear 33 and the control element 36 is shifted to the right as viewed in Fig. 1 so as to mesh with the teeth formed on the stationary race 41. Thus, the ring gear 33 is free to rotate while the control element 36 is held stationary, causing the power to flow in a path as indicated in Fig. 5D. The sun gear 29 will rotate again as shown by the central arrow in Fig. 2 and the planetary gears 30, 31 will continue to rotate in the directions indicated by the arrows in said Figure 2. However, since the gear 35 on control element 36 is held stationary, the planetary gear 31 meshing with the gear 35 is constrained to walk in a clockwise direction which is the forward direction. This forces the planetary carrier 34 to rotate the attached driven shaft 28 in the forward direction. High torque is available in this drive position since the torque of the driving shaft is always multiplied by the torque converter and the planetary gear train.

If the shifting lever 44 is moved to the position indicated at $D_2$ in Figure 4, the brake band 32 remains disengaged but the control element 36 is shifted to the left as viewed in Fig. 1 so as to engage the teeth on the end of sleeve 17. Initially when power is applied to the transmission while in this shift position, it follows a path through the torque converter and the planetary gear train corresponding to that of drive position C but thereafter its path may be altered so that the mechanical advantages provided by the torque converter and the planetary gear train are eliminated, and a 1 to 1 torque ratio or, in other words, what is substantially a direct drive is established between the driving shaft 1 and the driven shaft 28.

The automatic clutch is of the centrifugal type as disclosed in detail in my U. S. Patent No. 2,699,237. As shown in Fig. 1 and Fig. 3, the automatic clutch includes a drum 26 that is, in fact, a cylindrical projection from the arcuate segment 3 which supports the driving vanes 4. Arcuate clutch shoes 24, 24A are supported interiorly of the drum on pivot pins 73, 73A that are fixedly attached to a plate 23 which is centrally secured to the described sleeve 17. The pivotal support of the clutch shoes 24, 24A is such that they can move into clutching engagement with the drum 26. The shoes 24, 24A are normally held from engagement with the drum 26 by means of springs 25 that are tensioned between said shoes and short arms 53 which are likewise pivotally supported by pins 74 on the plate 23. Whenever this supporting plate 23 rotates with sleeve 17 in a forward direction above a predetermined rate of speed, the restraining force of the springs 25 is overcome so that the clutch shoes 24, 24A move outwardly into engagement with the drum 26 and thus establish direct mechanical connection from the driving shaft 1 through the clutch to the sleeve 17. Conversely, when the speed of sleeve 17 drops below said predetermined rate, the springs 25 disengage the clutch shoes from the drum 26 and transmission of power from the drive shaft 1 to intermediate shaft 22 occurs again exclusively through the torque converter.

In order to provide for arbitrary release of the clutching engagement of the shoes 24, 24A and drum 26, the free end of each shoe has an integral projection 55 provided with an opening which is loosely engaged by a pin 54 that projects from each of the described pivotally-supported arms 53. The free end of each arm 53 is arranged for frictional engagement with a collar 46 that is prevented from rotation, but slides axially on the exterior of the sleeve 17. A suitable linkage train 47, 48, 49, 50, 51, 52, as shown in Fig. 4, connects the collar 46 to the acceleration pedal 43 in such a manner that upon full depression of the pedal, the collar is caused to move forwardly on the sleeve 17, i. e. to the left as viewed in Fig. 1, into frictional engagement with the ends of both pivotally-supported arms 53. If it is assumed that the clutch drum 26 and the shoes 24, 24A are in contact with each other so that the supporting plate 23 and the arms 53 are rotating forwardly, as indicated by the arrow in Fig. 3, the engagement of the non-rotating collar 46 with the ends of the arms 53 will cam each pivot in a counterclockwise direction as viewed in Fig. 3 which causes them to pull the clutch shoes 24, 24A out of engagement with the drum 26. Thereafter the clutch shoes 24, 24A, the supporting plate 23 and the sleeve 17 will come to a standstill almost instantaneously because the accelerator pedal 43 is fully depressed to produce rapid forward rotation of the driving shaft 1 and the driving vanes 4; and the consequent reactive force tends to rotate the reactor vanes 10, 12 and the sleeve 15 bolted to sleeve 17 in the reverse direction.

Reverting now to the second drive position $D_2$ of the transmission of the present invention, it will be recalled that the brake band 32 is out of engagement with ring gear 33 and the teeth of the control element 36 are meshed with those at the end of the sleeve 17. In the beginning, the automatic clutch is disengaged and the flow of power through the transmission is similar to that in the first drive position C. As illustrated in Fig. 5B, the power from the driving shaft 1 passes through the torque converter to the intermediate shaft 22 and to the sun gear 29 thereon. The sun gear 29 causes the planetary gears 30, 31 to rotate as indicated by the arrows in Fig. 2. The ring gear 33, being unrestrained by the brake band 32 rotates freely, offering no reaction to rotation of the planetary gears 31, but the control element 36 is held against reverse rotation through its connection to the sleeve 17 which cannot move reversely because of the overrun rollers 18 that mount said sleeve on the stationary race 41. Consequently, planetary gears 31 walk around the gear 35 on the end of the control element 36, and the planetary carrier 34 and driven shaft 28 rotate forwardly with a high torque provided by the combined action of the torque converter and the planetary gear train. Thus, a high starting torque is obtained.

After a vehicle has been started in this second drive position and a desired speed has been obtained, the accelerator pedal 43 may be momentarily released to change the power transmission from the path shown in Fig. 5B, to that illustrated in Fig. 5C. When the pedal 43 is released, the momentum of the vehicle initiates temporarily a reverse power path, driven shaft 28 and the attached planetary carrier 34 rotate forwardly to urge sun gear 29, the gear 35 on control element 36, sleeve 17 and the clutch shoes 24, 24A in the forward direction. This causes the clutch shoes 24, 24A to engage the clutch drum 26 and renewed depression of the accelerator pedal will then result in power transmittal along a divided path as indicated in Fig. 5C. A portion of the power will be transmitted through the torque converter which is now merely a fluid coupling because due to the connection of sleeves 15 and 17 the reactor vanes 10, 12 are caused to rotate forward with the clutch shoes 24, 24A. The sun gear 29 will rotate and attempt to produce rotation of the planetary gears 30 and 31 with the gears 31 tending to rotate in a clockwise direction as shown in Fig. 2. However, power is also transmitted through the centrifugal clutch to the control element 36 and the integral gear 35 thereon, the latter tending to rotate planetary gears 31 in the opposite or counterclockwise direction as viewed in Fig. 2. The result is that all of the planetary gear train rotates substantially as a unit so that what amounts to substantially a direct drive with a 1 to 1 torque ratio is obtained between the driving shaft 1 and the driven shaft 28.

When it is desired that the direct drive be disconnected and a high torque ratio re-established, it is merely necessary that the vehicle operator press the accelerator pedal 43 to the floor to shift the release collar 46 so that it may disengage the clutch in the manner previously described. Thus, a high torque is immediately available to facilitate passing another vehicle or climbing a steep grade. Subsequent release of the accelerator pedal will again establish the described direct drive. In this manner, a high torque is made instantaneously available to the vehicle operator, yet the overall economy of vehicle operation obtainable only through a direct drive is preserved.

Various alterations and modifications of the disclosed embodiment of the invention can obviously be made without departing from the scope of the invention. Accordingly, the foregoing description is to be considered purely exemplary and not in a limiting sense, the actual scope of the invention being indicated by the appended claims.

This is a continuation of my pending patent application, Serial No. 365,282, filed on June 30, 1953.

I claim:

1. An arrangement for transmitting rotary power from a drive shaft to a coaxially disposed driven shaft comprising a torque converter arranged to receive power from said drive shaft, an auxiliary shaft disposed intermediately of said drive shaft and said driven shaft and arranged to receive power from said torque converter, a sun gear mounted upon said intermediate shaft for rotation therewith, a gear carrier secured to said driven shaft, a first planetary gear pivoted to said carrier in mesh with said sun gear, a second planetary gear pivoted to said carrier in mesh with said first planetary gear, a ring gear mounted for rotation coaxially around said sun gear in mesh with said second planetary gear, a sun reactor gear loosely mounted upon said auxiliary shaft in mesh with said second planetary gear, means selectively operable to hold said ring gear or said sun reactor gear against rotation, and means operable to connect positively said sun reactor gear to said drive shaft.

2. An arrangement for transmitting rotary power from a drive shaft to a driven shaft comprising a torque converter arranged to receive power from the drive shaft, an auxiliary shaft disposed intermediately of said drive shaft and said driven shaft and arranged to receive power from said torque converter, a clutch having its driving side connected to said drive shaft for rotation therewith and having a driven side adapted to engage said drive side upon attainment of a predetermined rotary speed by said driven side, a sun gear mounted upon said auxiliary shaft for rotation therewith, a gear carrier secured to said driven shaft, a first planetary gear pivoted to said carrier in mesh with said sun gear, a second planetary gear pivoted to said carrier in mesh with said first planetary gear, a ring gear mounted for rotation coaxially about said sun gear in mesh with said second planetary gear, a sun reactor gear loosely mounted upon said auxiliary shaft in mesh with said second planetary gear, and means selectively operable to hold said ring gear against rotation to effect reverse rotation of said driven shaft or to connect said sun reactor gear operatively to the driven side of said clutch to effect engagement of said clutch and thus establish a positive drive connection between said drive shaft and said sun reactor gear.

3. An arrangement for transmitting rotary power from a drive shaft to a coaxially disposed driven shaft comprising a torque converter arranged to receive power from the drive shaft, an auxiliary shaft disposed coaxially with and intermediately of said drive shaft and said driven shaft and arranged to receive power from said torque converter, a clutch having its driving side connected to said drive shaft for rotation therewith and having a driven side adapted to engage said drive side upon attainment of a predetermined rotary speed by said driven side, a sun gear mounted upon said auxiliary shaft for rotation therewith, a gear carrier secured to said driven shaft, a first planetary gear pivoted to said carrier in mesh with said sun gear, a second planetary gear pivoted to said carrier in mesh with said first planetary gear, a ring gear mounted for rotation coaxially about said sun gear in mesh with said second planetary gear, a sun reactor gear loosely mounted upon said auxiliary shaft in mesh with said second planetary gear, means operable to hold said ring gear against rotation to effect reverse rotation of said driven shaft, means operable to connect said sun reactor gear operatively to the driven side of said clutch to effect engagement of said clutch and thus establish a positive drive connection between said drive shaft and said sun reactor gear, and means manually operable to disengage said clutch.

4. An arrangement for transmitting rotary power from a drive shaft to a driven shaft comprising a hydraulic torque converter arranged to receive power from the drive shaft, an auxiliary shaft disposed intermediately of said drive shaft and said driven shaft and arranged to receive power from said torque converter, a clutch having its driving side connected to said drive shaft for rotation therewith and a driven side adapted to engage said driving side upon attainment of a predetermined rotary by said driven side, a sun gear mounted upon said auxiliary shaft for rotation therewith, a gear carrier secured to said driven shaft, a first planetary gear pivoted to said carrier in mesh with said sun gear, a second planetary gear pivoted to said carrier in mesh with said first planetary gear, a sun reactor gear mounted loosely upon said auxiliary shaft in mesh with said second planetary gear, and means selectively operable to hold said sun reactor gear against rotation to thereby effect a high torque forward rotation of said driven shaft, or to connect said sun reactor gear operatively with the driven side of said clutch to effect engagement of said clutch and thus establish a positive drive connection between said drive shaft and said sun reactor gear.

5. An arrangement for transmitting rotary power from a drive shaft to a driven shaft comprising a hydraulic torque converter arranged to receive power from the drive shaft, an auxiliary shaft disposed intermediately of said drive shaft and said driven shaft and arranged to receive power from said torque converter, a clutch having its driving side connected to said drive shaft for rotation therewith and a driven side adapted to engage said driving side upon attainment of a predetermined rotary speed by said driven side, a sun gear mounted upon said auxiliary shaft for rotation therewith, a gear carrier secured to said driven shaft, a first planetary gear pivoted to said carrier in mesh with said sun gear, a second planetary gear pivoted to said carrier in mesh with said first planetary gear, a sun reactor gear mounted loosely upon said auxiliary shaft in mesh with said second planetary gear, means selectively operable to hold said sun reactor gear against rotation to thereby effect a high torque forward rotation of said driven shaft, or to connect said sun reactor gear operatively with the driven side of said clutch to effect engagement of said clutch and thus establish a positive drive connection between said drive shaft and said sun reactor gear, and means manually operable to disengage said clutch.

6. An arrangement for transmitting rotary power from a drive shaft to a coaxially disposed driven shaft comprising a hydraulic torque converter arranged to receive power from the drive shaft, an auxiliary shaft disposed coaxially with and intermediately of said drive shaft and said driven shaft and arranged to receive power from said torque converter, a clutch having its driving side connected to said drive shaft for rotation therewith and a driven side adapted to engage said driving side upon attainment of a predetermined rotary speed by said driven side, a sun gear mounted upon said auxiliary shaft for rotation therewith, a gear carrier secured to said driven shaft, a first planetary gear pivoted to said carrier in mesh with said sun gear, a second planetary gear pivoted to said carrier in mesh with said first planetary gear, a ring gear mounted for rotation about said sun gear concentrically therewith and in mesh with said second planetary gear, a sun reactor gear mounted loosely upon said auxiliary shaft in mesh with said second planetary gear, means operable to hold said ring gear against rotation, means selectively operable to hold said sun reactor gear against rotation or to connect said sun reactor gear operatively with the driven side of said clutch to effect engagement thereof with the driving side of said clutch and thus establish a positive drive connection between said drive shaft and said sun reactor gear.

7. An arrangement for transmitting rotary power from a drive shaft to a coaxially disposed driven shaft comprising a hydraulic torque converter arranged to receive power from the drive shaft, an auxiliary shaft disposed coaxially with and intermediately of said drive shaft and said driven shaft and arranged to receive power from said torque converter, a clutch having its driving side connected to said drive shaft for rotation therewith and a driven side adapted to engage said driving side upon attainment of a predetermined rotary speed, a sun gear mounted upon said auxiliary shaft for rotation therewith, a gear carrier secured to said driven shaft, a first planetary gear pivoted to said carrier in mesh with said sun gear, a second planetary gear pivoted to said carrier in mesh with said first planetary gear, a ring gear mounted for rotation about said sun gear concentrically therewith and in mesh with said second planetary gear, a sun reactor gear mounted loosely upon said auxiliary shaft in mesh with said second plantary gear, means operable to hold said ring gear against rotation to thereby effect reverse rotation of said gear carrier and said driven shaft, means selectively operable to hold said sun reactor gear against rotation to thereby effect a high torque forward rotation of said gear carrier and said driven shaft, or to connect said sun reactor gear operatively with the driven side of said clutch to effect engagement of said clutch and thus establish a direct drive connection between said drive shaft and said sun reactor gear, and means manually operable to dissengage said clutch.

References Cited in the file of this patent

UNITED STATES PATENTS

| | | |
|---|---|---|
| 2,679,169 | Duffield | May 25, 1954 |
| 2,694,949 | McFarland | Nov. 23, 1954 |
| 2,749,777 | Simpson | June 12, 1956 |